United States Patent [19]

Behrend et al.

[11] Patent Number: 4,619,337

[45] Date of Patent: Oct. 28, 1986

[54] ELECTRIC BALANCE WITH SCALE ON TOP

[75] Inventors: Lothar Behrend, Gleichen; Jürgen Ober, Hardegsen; Erich Knothe, Bovenden; Franz-Josef Melcher, Hardegsen, all of Fed. Rep. of Germany

[73] Assignee: Sartorius GmbH, Fed. Rep. of Germany

[21] Appl. No.: 716,082

[22] Filed: Mar. 26, 1985

[30] Foreign Application Priority Data

Mar. 29, 1984 [DE] Fed. Rep. of Germany ....... 3411550

[51] Int. Cl.$^4$ ..................... G01G 3/14; G01G 23/00; G01G 23/10
[52] U.S. Cl. ................................ 177/210 R; 177/189; 177/245; 177/211
[58] Field of Search ........... 177/185, 187, 189, 210 R, 177/210 EM, 211, 212, 245

[56] References Cited

U.S. PATENT DOCUMENTS

| 3,968,850 | 7/1976 | Gaskill | 177/185 X |
| 3,973,637 | 8/1976 | Kunz | 177/189 |
| 4,039,036 | 8/1977 | Boumgartner et al. | 177/212 |
| 4,090,575 | 5/1978 | Kunz et al. | 177/210 EM |
| 4,341,275 | 7/1982 | Stadler et al. | 177/212 |

Primary Examiner—E. A. Goldberg
Assistant Examiner—Patrick W. Foster
Attorney, Agent, or Firm—Eric P. Schellin

[57] ABSTRACT

In order to reduce the coupling-in of high-frequency electromagnetic interference into the measuring system of electric balances with scale on top and with a metallic balance scale and a metallic housing, a pin (7) which establishes the connection between the balance scale (2) and the load receiver (5) of the measuring system comprises an insulating layer on its surface which is bridged by a resistor (6) located on the pin (7).

9 Claims, 5 Drawing Figures

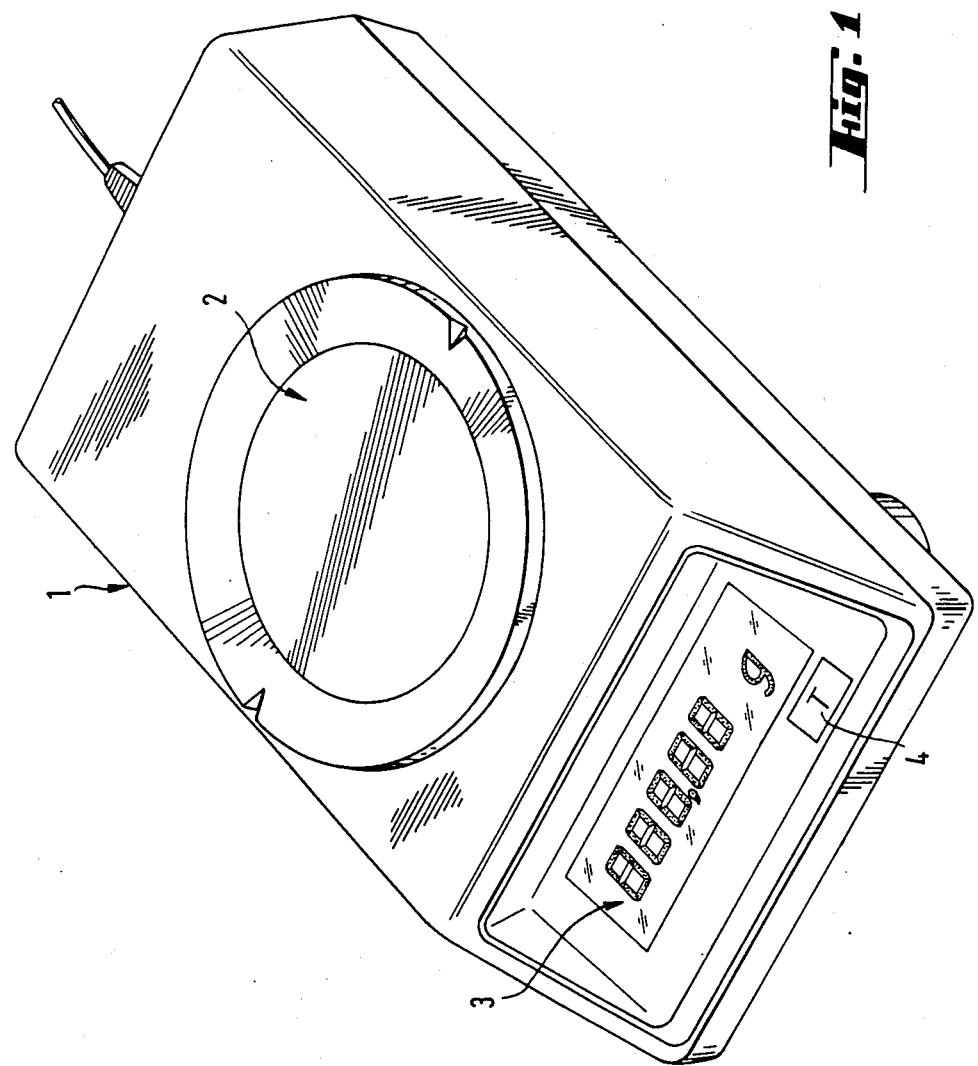

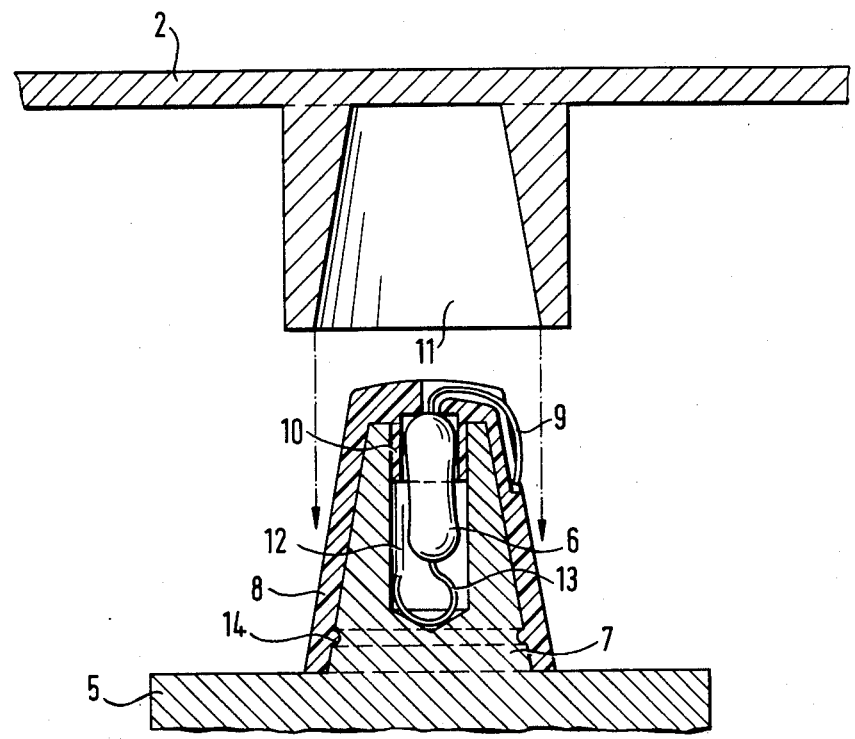

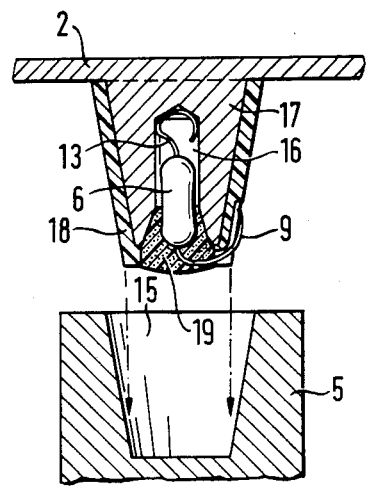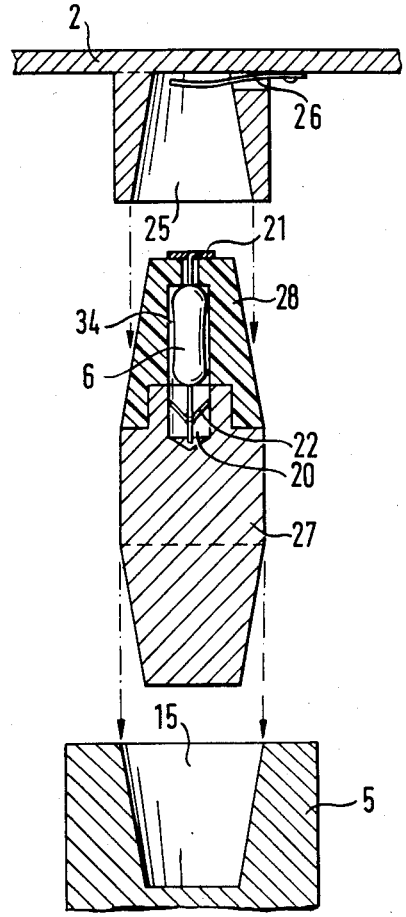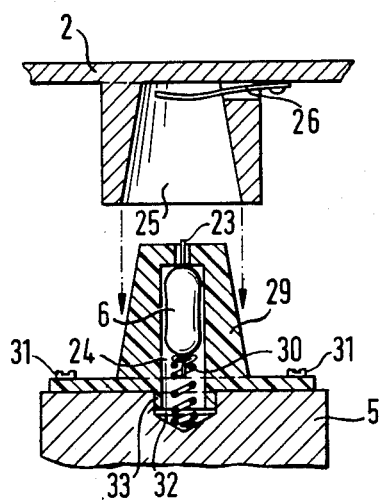

4,619,337

ELECTRIC BALANCE WITH SCALE ON TOP

BACKGROUND OF THE INVENTION

The invention is related to an electric balance having a housing and a metallic balance scale which is located over the housing. The metallic balance is supported in a removable manner by at least one pin through at least one perforation in the housing on at least one metallic load receiver of a measuring system. Balances of this type are generally known. For example, DE-OS No. 31 36 049 teaches such a balance with a measuring system based on the principle of the electromagnetic compensation of force. The balance scale and the load receiver of the measuring system are usually metallically connected to one another and to the balance housing in order to prevent an electrostatic charging of the balance scale. However, this has the disadvantage that high-frequency electromagnetic alternating fields in the vicinity of the balance are picked up by the balance scale acting as an antenna and conducted directly into the measuring system. This can disturb the electronic components of the measuring system.

SUMMARY

The invention has the task of connecting the balance scale to the load receiver in such a manner that high-frequency electromagnetic alternating fields penetrate as little as possible to the load receiver without hindering the conductive discharge of static charges. In addition, the measures necessary for this should be integrated as much as possible into the customary design of the balance and not make it more difficult to remove the balance scale.

The invention achieves this task as follows: A layer of insulation is positioned between the metallic balance scale and the metallic load receiver which is bridged by a resistor located in the pin.

Advantageous embodiments are presented in the subclaims.

BRIEF DESCRIPTION OF THE DRAWINGS

The invention is described below with reference made to the schematic drawings.

FIG. 1 shows a perspective view of the electric balance.

FIG. 2 shows the pin between the balance scale and the load receiver in a first embodiment.

FIG. 3 shows the pin between the balance scale and the load receiver in a second embodiment.

FIG. 4 shows the pin between the balance scale and the load receiver in a third embodiment.

FIG. 5 shows the pin between the balance scale and the load receiver in a fourth embodiment.

DETAILED DESCRIPTION

FIG. 1 shows housing 1, balance scale 2, display 3 and tare key 4 of the electric balance. Balance scale 2 is manufactured from metal, e.g., high-grade steel. Housing 1 is likewise manufactured from metal or from plastic which is metallized on one or on both sides in order to achieve a screening action against electrical interference. A perforation is present underneath balance scale 2 in housing 1 and balance scale 2 is supported by a pin in a removable manner on a load receiver of the measuring system. This support is shown in detail in various embodiments in FIGS. 2 to 5, whereby balance scale 2 is raised somewhat for the sake of clarity.

In FIG. 2 load receiver 5 comprises a pin 7 in the form of a truncated cone-like elevation. Blind hole 12 is centrally located in pin 7. Pin 7 is covered by an approximately thimble-shaped cap 8 consisting of an insulating material, e.g. plastic. This plastic cap 8 comprises a short centering tube 10 which holds resistor 6 at a distance from metallic pin 7 of load receiver 5. The lower connection wire 13 of resistor 6 is bent in such a manner that when it is introduced into blind hole 12 it contacts its wall in an elastic manner, therewith establishing the electric contact with load receiver 5. Upper connection wire 9 is introduced into a recess of plastic cap 8 and projects somewhat above its surface so that when balance scale 2 is put on, it elastically contacts its metallic cone 11 and establishes the elctric contact with balance scale 2. Plastic cap 8 is adhered to pin 7 and/or held fast by a small bead 14 which fits into a corresponding groove in pin 7.

FIG. 3 shows another embodiment. Here, the load receiver 5 comprises a truncated cone-like cavity 15 into which pin 17 attached to the bottom of balance scale 2 can enter. Pin 17 comprises insulating layer 18 on its jacket surface and a blind hole 16 is once again present in the center of pin 17 for receiving resistor 6. Resistor 6 is fixed in this embodiment by casting resin or an appropriate sealing compound. The contacts of resistor 6 are established as was done in the embodiment of FIG. 2.

A third embodiment is shown in FIG. 4. Here, pin 27 is constructed as a separate construction element and fits with one end into conical cavity 15 in load receiver 5 and with the other end into conical cavity 25 on the bottom of balance scale 2. The insulating layer is in the form of a plastic cap 28 on the top of pin 27. Resistor 6 rests partially in blind hole 20 in pin 27 and partially in round recess 34 in plastic cap 28. The upper connection wire of resistor 6 ends in metallic disk 21 on plastic cap 28. This holds resistor 6 in plastic cap 28. Both parts are pushed together during assembly from above onto pin 27 and fixed as described for FIG. 2. A thin, V-shaped leaf spring 22 is soldered to the lower connection wire of resistor 6 which establishes the contact with pin 27 in an elastic manner. Another leaf spring 26 is attached to the bottom of balance spring 2 which establishes the contact with disk 21 when balance scale 2 is put on the upper part of pin 27.

In the embodiment of FIG. 5 the pin consists of a truncated cone-like plastic part 29 which is screwed fast, e.g., by screws 31 to load receiver 5 and is centered by a small tubular extension 33 in blind hole 32 of load receiver 5. Resistor 6 lies loosely in hole 24 of plastic pin 29. The one connection wire 23 of resistor 6 ends shortly above the cover surface of plastic pin 29 and establishes the electric connection to leaf spring 26 on balance scale 2 when balance scale 2 is put on. The lower end of resistor 6 is conductively connected to the load receiver by small coil spring 30.

The resistance of resistor 6 is approximately between 100 and 10,000 ohms, preferably between 500 and 1,000 ohms, depending on the requirement.

The various embodiments explained above are given only as possible examples. The various fastening modes of the resistor, the various manners of establishing contact and the various arrangements of the pin can of course also be combined in another manner.

In an electric balance in which the balance scale is supported on account of its size by several pins on the load receiver or load receivers of the measuring system, the insulating layer must naturally be present on all pins, while the resistor could be built into only one pin.

What is claimed is:

1. Electric balance having a housing and a metallic balance scale which is located over the housing and is supported in a removable manner by at least one pin through at least one perforation in the housing on at least one metallic load receiver of a measuring system, characterized in that an insulating layer (8, 18, 28, 29) is located between the metallic balance (2) and the metallic load receiver (5) insulating the scale from the receiver, the insulation is bridged by a resistor means (6) located on the pin (7, 17, 27), the resistor means prevents electrostatic charging of the scale while also preventing electromagnetic alternating fields from affecting the balance.

2. Electric balance according to claim 1, characterized in that the pin (7) is located on the top of the load receiver (5) and extends into a corresponding cavity (11) on the bottom of the balance scale (2).

3. Electric balance according to claim 1, characterized in that the pin (17) is located on the bottom of the balance scale (2) and extends into a corresponding cavity (15) on the top of the load receiver (5).

4. Electric balance according to claim 1, characterized in that the pin (27) is constructed as a separate construction element and extends into a cavity (15,25) on the top of the load receiver and into a cavity on the bottom of the balance scale (2).

5. Electric balance according to either claims 1, 2, 3 or 4, characterized in that the pin (7, 17, 27) comprises a truncated cone-like end area.

6. Electric balance according to claim 5, characterized in that the pin (7, 17, 27) is manufactured from an electrically conductive material and the insulating layer (8, 18, 28) is located on the surface of the pin.

7. Electric balance according to claim 5, characterized in that the pin is manufactured at least partially from an insulating material.

8. Electric balance according to claim 5, characterized in that the resistor means (6) located on the pin is located in an approximately cylindrical, vertical hollow chamber (12, 16, 20, 34 24) of the pin.

9. Electric balance according to claim 5, characterized in that the resistor means (6) located in the pin has a resistance between 100 and 10,000 ohms.

* * * * *